(12) United States Patent
Keiser et al.

(10) Patent No.: US 7,804,941 B2
(45) Date of Patent: Sep. 28, 2010

(54) SYSTEMS AND METHODS FOR MESSAGE DELIVERY IN A CONTROLLED ENVIRONMENT FACILITY

(75) Inventors: Luke Keiser, Frisco, TX (US); Michelle L. Polozola, Richardson, TX (US); Peter Keahon, Dallas, TX (US)

(73) Assignee: Securus Technologies, Inc., Dallas, TX (US)

( * ) Notice: Subject to any disclaimer, the term of this patent is extended or adjusted under 35 U.S.C. 154(b) by 1125 days.

(21) Appl. No.: 11/480,289

(22) Filed: Jun. 30, 2006

(65) Prior Publication Data

US 2008/0040781 A1    Feb. 14, 2008

(51) Int. Cl.
  *H04M 1/64*   (2006.01)
  *H04M 11/00*  (2006.01)
  *H04M 15/00*  (2006.01)

(52) U.S. Cl. .............. 379/88.14; 379/88.12; 379/88.19; 379/88.22; 379/114.2

(58) Field of Classification Search ................ 379/67.1, 379/71, 85, 87, 88.04, 88.07, 88.08, 88.11, 379/88.13, 88.14, 88.19, 88.25, 88.26, 88.22, 379/114.01, 114.2, 88.12
See application file for complete search history.

(56) References Cited

U.S. PATENT DOCUMENTS

| | | |
|---|---|---|
| 4,458,109 A | 7/1984 | Mueller-Schloer |
| 5,185,781 A | 2/1993 | Dowden et al. |
| 5,210,789 A | 5/1993 | Jeffus et al. |
| 5,517,555 A | 5/1996 | Amadon et al. |
| 5,553,145 A | 9/1996 | Micali |
| 5,594,789 A | 1/1997 | Seazholtz et al. |
| 5,627,887 A | 5/1997 | Freedman |
| 5,655,013 A | 8/1997 | Gainsboro |
| 5,805,810 A | 9/1998 | Maxwell |
| 5,826,034 A | 10/1998 | Albal |
| 5,832,068 A | 11/1998 | Smith |
| 5,937,044 A | 8/1999 | Kim |

(Continued)

FOREIGN PATENT DOCUMENTS

WO    WO 99/21330    4/1999

(Continued)

OTHER PUBLICATIONS

European Search Report dated Oct. 17, 2007.

(Continued)

*Primary Examiner*—Binh K Tieu
(74) *Attorney, Agent, or Firm*—Fogarty, L.L.C.

(57) ABSTRACT

Systems and methods are disclosed for sending and receiving a message between a nonresident and a resident of a controlled environment facility that associates an identifier to the message, wherein the resident does not associate the identifier to resident created messages. The identifier my take the form of a barcode printed directly onto the message form or printed onto a detachable sticker that is affixed to the message form. Embodiments may allow the searching of a message for prohibited words, phrases, or ideas and notifying a relevant authority to the existence of such prohibited content. Embodiments may also allow a nonresident to select a delivery medium that is incompatible with the format of a message created by a resident by converting the resident created message to a message format compatible with the delivery medium.

33 Claims, 2 Drawing Sheets

U.S. PATENT DOCUMENTS

| | | | |
|---|---|---|---|
| 5,982,506 | A | 11/1999 | Kara |
| 6,078,892 | A | 6/2000 | Anderson et al. |
| 6,202,060 | B1 | 3/2001 | Tran |
| 6,282,276 | B1 | 8/2001 | Felger |
| 6,330,546 | B1 | 12/2001 | Gopinathan et al. |
| 6,353,663 | B1 | 3/2002 | Stevens et al. |
| 6,377,938 | B1 | 4/2002 | Block et al. |
| 6,397,055 | B1 | 5/2002 | McHenry et al. |
| 6,421,707 | B1 * | 7/2002 | Miller et al. ............... 709/206 |
| 6,430,274 | B1 | 8/2002 | Winstead et al. |
| 6,434,378 | B1 | 8/2002 | Fougnies |
| 6,483,910 | B1 | 11/2002 | Council |
| 6,516,056 | B1 | 2/2003 | Justice et al. |
| 6,636,591 | B1 | 10/2003 | Swope et al. |
| 6,639,977 | B1 | 10/2003 | Swope et al. |
| 6,639,978 | B2 | 10/2003 | Draizin et al. |
| 6,665,380 | B1 | 12/2003 | Cree et al. |
| 6,668,045 | B1 * | 12/2003 | Mow ..................... 379/88.19 |
| 6,947,532 | B1 | 9/2005 | Marchand et al. |
| 7,158,621 | B2 | 1/2007 | Bayne |
| 7,649,877 | B2 * | 1/2010 | Vieri et al. ................. 370/352 |
| 7,706,511 | B2 * | 4/2010 | Vieri et al. ............... 379/88.14 |
| 2001/0011228 | A1 | 8/2001 | Shenkman |
| 2001/0028705 | A1 | 10/2001 | Adams et al. |
| 2002/0025028 | A1 | 2/2002 | Manto |
| 2002/0106065 | A1 | 8/2002 | Joyce et al. |
| 2002/0115424 | A1 | 8/2002 | Bagoren et al. |
| 2002/0136374 | A1 | 9/2002 | Fleischer, III et al. |
| 2002/0138417 | A1 | 9/2002 | Lawrence |
| 2002/0147002 | A1 | 10/2002 | Trop et al. |
| 2002/0184103 | A1 | 12/2002 | Shah et al. |
| 2002/0194096 | A1 | 12/2002 | Falcone et al. |
| 2002/0194113 | A1 | 12/2002 | Lof et al. |
| 2003/0002639 | A1 | 1/2003 | Huie |
| 2003/0008634 | A1 | 1/2003 | Laybourn et al. |
| 2003/0028380 | A1 * | 2/2003 | Freeland et al. ............. 704/260 |
| 2003/0046208 | A1 | 3/2003 | Lubking et al. |
| 2003/0064380 | A1 | 4/2003 | Rao et al. |
| 2003/0208371 | A1 | 11/2003 | McGrath |
| 2004/0078328 | A1 | 4/2004 | Talbert et al. |
| 2004/0215472 | A1 | 10/2004 | Gleckman |
| 2006/0245559 | A1 * | 11/2006 | Hodge et al. ............. 379/88.19 |
| 2007/0003026 | A1 * | 1/2007 | Hodge et al. ............... 379/88.1 |
| 2008/0010355 | A1 * | 1/2008 | Vieri et al. .................. 709/206 |

FOREIGN PATENT DOCUMENTS

| | | |
|---|---|---|
| WO | WO 99/21330 A1 | 4/1999 |
| WO | WO 99/48054 | 9/1999 |
| WO | WO 99/48054 A1 | 9/1999 |
| WO | WO 01/72018 A2 | 9/2001 |
| WO | WO 02/01379 A2 | 1/2002 |

OTHER PUBLICATIONS

International Search Report and the Written Opinion of the International Searching Authority for International Application No. PCT/US 07/72537 dated Jan. 7, 2008.

Electronic Message Solutions, Inc., "Improving Relationships through faster Correspondence," 2004 Electronic Message Solutions, Inc., Dec. 9, 2005, http://www.inmatemail.com/default.aspx, p. 1 of 1.

International Search Report and Written Opinion of the International Searching Authority for International Application No. PCT/US08/63924, dated Jul. 18, 2008, 9 pages.

Swope, B., et al., U.S. Appl. No. 09/640,831, "System and Method for Reverse Billing for Telephone Call," filed Aug. 17, 2000 (Reference not included).

Viola, J., et al., U.S. Appl. No. 10/135,878, "Information Management and Movement System and Method," filed Apr. 29, 2002 (Reference not included).

Sullivan, R. et al., U.S. Appl. No. 10/602,233,"Systens and Methods for Transaction and Information Management," filed Jun. 24, 2003 (Reference not Included).

Rae, R., U.S. Appl. No. 10/642,532, "Centralized Call Processing," filed Aug. 15, 2003 (Reference not Included).

Viola, J.,et al., U.S. Appl. No. 10/720,732, "Information Management and Movement System and Method," filed Nov. 24, 2003 (Reference not Included).

Viola, J., et al., U.S. Appl. No. 10/720,848, "Information Management and Movement System and Method," filed Nov. 24, 2003 (Reference not Included).

Rae, et al., U.S. Appl. No. 10/800,473, "Centralized Call Processing," filed Mar. 15, 2004 (Reference not Included).

Rosenfield, S., et al., U.S. Appl. No. 10/836,976, "Systems and Methods for Transaction and Information Management," filed Apr. 30, 2004 (Reference not Included).

Keiser, L., et al., U.S. Appl. No. 11/125,842, "Processor-based Self-service Terminals Used with Respect to Controlled Environment Facilities," filed May 10, 2005 (Reference not Included).

Sidler, J., et al., U.S. Appl. No. 11/182,625, "Systems and Methods for Acquiring, Accessing, and Analyzing Investigative Information," filed Jul. 15, 2005 (Reference not Included).

European Patent Office, Examination Report for European patent application No. 07 252 639.5, dated Apr. 16, 2009.

* cited by examiner

FIG. 3

SYSTEMS AND METHODS FOR MESSAGE DELIVERY IN A CONTROLLED ENVIRONMENT FACILITY

CROSS-REFERENCE TO RELATED APPLICATIONS

The present application is related to co-pending and commonly assigned U.S. patent application Ser. No. 10/720,732 entitled "INFORMATION MANAGEMENT AND MOVEMENT SYSTEM AND METHOD;" Ser. No. 10/720,848 entitled "INFORMATION MANAGEMENT AND MOVEMENT SYSTEM AND METHOD;" Ser. No. 11/182,625 entitled "INFORMATION SYSTEMS AND METHODS FOR ACQUIRING, ACCESSING, AND ANALYZING INVESTIGATIVE INFORMATION;" Ser. No. 11/125,842 entitled "INFORMATION MANAGEMENT AND MOVEMENT SYSTEM AND METHOD;" and Ser. No. 10/640,506 entitled "SYSTEM AND METHOD FOR CALLED PARTY CONTROLLED MESSAGE DELIVERY." The disclosures of each of which are hereby incorporated by reference in their entirety.

TECHNICAL FIELD

The invention relates generally to message transmission and delivery and, more particularly, to message transmission and delivery in association with a controlled environment facility.

BACKGROUND OF THE INVENTION

Some controlled environment facilities (e.g., those administered by the Texas Department of Criminal Justice (TDCJ)) only allow messages to and from residents via postal mail. Yet there is a large administrative overhead in managing postal mail. For example, the current process usually involves receiving, opening, and reading the mail, to prohibit certain activities, such as issuing threats, sending inappropriate pictures or magazines, or conducting confidence games. The mail is then put back in the envelope and delivered to the resident of the facility. As an example of the volume of mail, between Mar. 1, 2003 and Aug. 31, 2003, there were 9,787,751 pieces of outgoing correspondence and 9,989,414 pieces of incoming correspondence at all 105 TDCJ units, not including packages, books, newspapers, publications or free printed material.

Further compounding the problems associated with handling the volume of communication, the communications must typically be reviewed to prevent residents from sending prohibited content or engaging in prohibited activities. Residents attempt to engage in prohibited activities by using increasingly sophisticated ways of obfuscating their activities. Some examples include: creating a fake legal document with threats or other instructions hidden within; creating a Thanksgiving card with a small strip of paper glued into the seams that has a code for encrypting a next set of communications; or using ancient languages, such as Aramaic, to communicate threats or other instructions. As a result, even facilities having strict reviewing and handling processes and procedures that are followed for communications with residents are often unable to adequately review the correspondence and/or spend an appreciable amount of resources in the effort.

Communication systems have been developed to facilitate communications between residents and nonresidents of controlled environment facilities. One prior art system, Electronic Message Exchange from Electronic Message Solutions, Inc., allows nonresidents to communicate through a web portal with residents who may only receive written or printed correspondence. A nonresident, sets up an account and, with an Internet browser, logs on to a website that is used for creating and receiving messages. The messages created for delivery to a resident are then printed out and processed as per postal mail, e.g., with regard to reviewing content thereof, before being delivered to the resident. The resident also may receive message forms with boxes to be filled in for identifying the recipient of the resident's message in addition to space for the actual message. The filled out message form may then be processed and converted by an optical scanner into an electronic image that may be downloaded for viewing or otherwise viewed from the web portal by the nonresident.

Residents bear the responsibility of properly identifying the account to be billed when creating and sending messages and, in most cases dutifully perform this task in a timely and correct manner, wanting to communicate with their friends and family. However, some residents may make unintentional mistakes or other residents may purposefully identify an improper account to be billed. As an example, such maliciousness may be due to a resident's desire to prolong the communication between himself and his lawyer to set up grounds for a lawsuit based on inadequate legal representation or inadequate access thereto, or to attempt to send a message to a person or entity that the resident is not allowed to communicate with.

Depending on the facility, some residents may use multiple methods for sending and receiving communication, but may not have a way of selecting to receive messages in different formats. As an example, a resident does not have a way to convert a message originated as a voicemail message to a printed transcript to keep for his/her personal records.

BRIEF SUMMARY OF THE INVENTION

Systems and methods are disclosed for sending and receiving a message between a nonresident and a resident of a controlled environment facility that associates an identifier to the message. The identifier may be used to identify a billing account, such as that of the nonresident or the resident, to pay for the delivery of the message. Embodiments of the invention may also allow for the identifier to be placed onto a message form used by the resident to create a message. In such cases the identifier my take the form of a machine readable code, such as a barcode, printed directly onto the message form or printed onto a detachable sticker that is affixed to the message form. Controlled environment facilities with which systems and methods of the present invention may be used include inmate facilities (e.g., municipal jails, county jails, state prisons, federal prisons, military stockades, juvenile facilities, and detention camps), hospitals, nursing homes, camps, and the like.

Embodiments of the invention may allow a nonresident or a controlled environment facility to select a delivery medium that is incompatible with the format of a message created by a resident by converting the resident created message to a message format compatible with the delivery medium. Embodiments may additionally or alternatively allow the nonresident or controlled environment facility to select a medium for delivery of a message to a resident that is incompatible with the message format used to create the message. As an example, the nonresident may create a voice message which is then converted to a transcript via a text to speech converter, with the transcript being delivered to the resident. As another example, a facility may only allow paper-based messages to be delivered to a resident, and in such cases the nonresident may use a computer or telephone to create an electronic or voice message, which would be converted to a paper-based message for delivery to a resident.

Further embodiments of the invention use automated techniques to search a message for words, phrases, or ideas of interest to a relevant authority, and may notify an authority to the existence of such content of interest. Embodiments may additionally or alternatively search for evidence of activities of interest by searching the messages for the parties involved in the communication and where the message originated from. Embodiments may also store information based on searches and/or notify a relevant authority as to the information stored.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Communicating with residents of a controlled environment facility is often hampered by the required handling and reviewing of that correspondence. Additionally, regulations governing such facilities may explicitly prohibit or otherwise disallow modern methods of communication, such as via telephone/voicemail or email. Embodiments of the present invention provide systems and methods which facilitate the use of modern methods of communication with respect to controlled environment facilities, even where regulations or other controlling rules prevent the direct use of such modern methods of communications by residents thereof. Such embodiments preferably provide for monitoring of communications as well as notification of appropriate persons of any evidence of content or activities that may be of interest to an investigator, even if the message is not unauthorized or otherwise prohibited. Accurate association of messages with residents, nonresidents, and accounts is preferably provided, such as to facilitate communications, accurately account for communications services, and/or provide rich investigative information.

A nonresident may be any person or entity that communicates with residents of a controlled environment facility, including: friends and family members of a resident, attorneys or other legal counsel of a resident, or any entity conducting business with a resident. A resident may be any person staying in a controlled environment facility, including: inmates of a correctional facility; short-term or long-term patients of a medical facility; residents of a nursing home; and the like. A communication service provider, or provider, may be any person or entity that facilitates communication between a nonresident and a resident of a facility utilizing the invention. The provider maintains a plurality of billing accounts that are set up and paid for with a financial account of either a resident or nonresident. In the case of a resident owning an account, the account may be the same as or may be paid for by a resident's trust account or commissary account. A facility may be any controlled environment facility, including inmate facilities (e.g., municipal jails, county jails, state prisons, federal prisons, military stockades, juvenile facilities, and detention camps), hospitals, nursing homes, camps, and the like, wherein the residents within the institution have restricted and/or limited access to communications.

The financially responsible party may control which residents and/or nonresidents are associated with the account. As such, a nonresident responsible for an account may associate multiple residents from multiple controlled environment facilities to the account. Alternatively, a resident responsible for an account may associate multiple nonresidents to the account. According to an embodiment of the invention, such associations may be made by using a computer to log onto a website of the provider, wherein the association of residents/nonresidents may be added to, changed within, or removed from an account.

In additional or alternative embodiments, the financially responsible party may control other features of the billing account such as controlling which resident/nonresident may send/receive messages using a billing account. As an example, a nonresident may establish a billing account to communicate with a certain resident of a certain controlled environment facility. In this case, the nonresident may associate the certain resident to the account, such that no other residents, except for the certain resident, may use the nonresident's billing account to send messages. A resident may similarly control a billing account that they own, such that only nonresidents that have been associated to the billing account by the resident may send messages using the resident's billing account. The financially responsible party controlling the account may associate any number of residents, nonresidents, or facilities to the account and such associations may further be restricted by any of: the facility, the provider, an authority, or the like.

Figure 1:
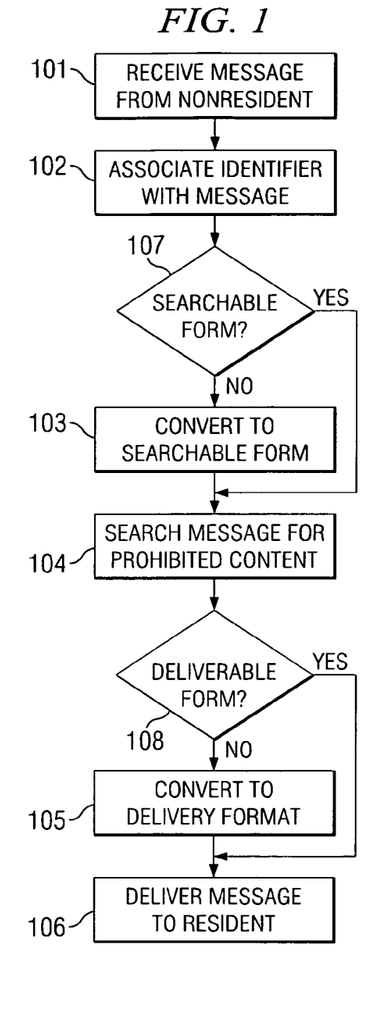
FIG. 1 is a flowchart showing, for an embodiment of the invention, example steps that may be employed for sending a message from a nonresident to a resident of a controlled environment facility.

FIG. 1 is a flowchart showing, for an embodiment of the invention, example steps that may be employed for sending a message from a nonresident to a resident of a controlled environment facility. In step 101, a system receives a message from a nonresident. The message may be created via any suitable means so long as the content of the message is in or may be converted to an electronically searchable form. As an example, a nonresident may dictate a voice message, which may be converted into electronically searchable text through the use of a speech to text converter. Other message formats/mediums used by a nonresident to create a message may include: an email created with a computer; a handwritten or printed letter; a text message created with a computer; a Short Message Service (SMS) message created with a mobile telephone; or the like.

Further, the nonresident may create messages in the form of an instant message created with software such as AIM from America Online, Inc., MSN Messenger from Microsoft Corp., icq from ICQ Inc., or other similar software. Messages may also be in the form of an email message created with Microsoft Outlook, Lotus Notes, an internet browser connected to an Internet email website (such as Yahoo! Mail of Yahoo! Inc., Gmail of Google Inc., MSN Hotmail of Microsoft Corp., and the like). Messages may also be in the form of a recorded audio file of such formats including: uncompressed formats, such as WAV, AIFF and AU; formats with lossless compression, such as FLAC, Monkey's Audio (filename extension APE), WavPack, Shorten, TTA, Apple Lossless, and lossless Windows Media Audio (WMA); formats with lossy compression, such as MP3, Ogg Vorbis (filename extension OGG), lossy Windows Media Audio (WMA), AAC, and other suitable formats. A message may also be in the form of a recorded video file whose formats include: WAV, AIFF, AVI, MOV, MPEG-2, MP4, and other suitable formats.

Step 102 associates an identifier to the message received in step 101. The identifier may be used to link and/or identify some or all of the following: the nonresident; the resident; the controlled environment facility; a billing account (e.g., of the nonresident or resident); the previous message(s) to which the current message is responding; the current message; and the like. The type of identifier may also be based on the message format. In the case of a letter, the identifier may be a unique sequence of letters and/or numbers printed onto the original letter in the form of a machine readable code, such as a barcode. As another example, a universally unique identifier (UUID) may be generated and associated to any of the electronic message formats. A UUID is a 128-bit pseudo-random number that is documented as a part of International Organization for Standardization (ISO)/International Electrotechnical Commission (IEC) 11578:1996 that is typically used to uniquely identify electronic files, computer programs, and the like. The identifier may further link the message to any of: a billing account maintained by a provider; a financial account used to pay for the delivery of the message; or any other information relevant to the resident, nonresident, facility, or provider. The financial account linked to the message via the identifier may then be debited after a message for delivery to a resident has been received and an identifier has been properly associated with the message. In additional or alternative embodiments of the invention where the resident maintains financial responsibility for the billing account, the financial account of the resident may not be debited until after the resident has actively selected to receive the message, so that the financially responsible resident will not have to pay for any unwanted communications.

According to an embodiment of the invention, the identifier may be unique for each message sent. In additional or alternative embodiments, a message sent in response to a prior message may have the same identifier as the prior message, thereby linking the prior message and its response. In further additional or alternative embodiments, the identifier may also incorporate relevant information within the actual identifier, which may optionally be human readable and may include any of: the identity of the nonresident, resident, and/or facility; the date and/or time the message was received; an indication of whether the message is under investigation; and the like.

If step 107 determines that the message is not in an appropriate electronically searchable format, then step 103 converts the message received in step 101 into an appropriate electronically searchable format. It is noted that with the many different message creation formats available, many different conversion methods may be used, with some methods performing little if any conversion and others performing more extensive conversion. As an example, an email, text message, or SMS message is already in the form of electronic text and may be implemented with little or no conversion. As another example, a letter may be converted to an electronically searchable form by scanning the letter and performing an optical character recognition (OCR) analysis to generate an electronic text version of the letter. Once an appropriate electronically searchable form of the message is created, embodiments of the invention may add an electronic version of the identifier to the message's electronic form.

If step 107 determines that the message is in an appropriate electronically searchable format or the message has been converted via step 103, then step 104 searches the searchable message for content, which may be of interest to authorities or investigators. Keyword searching, phrase searching, and systems and methods according to application Ser. Nos. 10/720,848 and 11/182,625 may be employed to determine if a message contains content or evidence of activity of interest to an authority or investigator. Additionally or alternatively, searches relating to the parties involved in the communication, the sending or receiving addresses, the billing account used to pay for the communication, the volume of communication activity, or the like, may by performed. Information based on the output of such searching may be stored and thresholds on the types of information may be used to determine whether such information is forwarded to a relevant authority. As an example, a single occurrence of certain words or phrases may cause the message to be forwarded to an authority, while other words or phrases may have multiple occurrences before the message is forwarded to an authority. Further, delivery of the message may be based on the information found when searching the message (e.g., messages containing any or a certain amount of content of interest may be denied delivery).

If step 108 determines the message is not in an appropriate delivery format, then step 105 converts the searched message to an appropriate delivery format. The delivery format may be based on the format of the original message or, in additional or alternative embodiments, the delivery format may be selected by the nonresident receiving the message. In the case where the delivery format is the same as that of the creation format, little actual conversion may take place. In other cases, the conversion of step 105 may be more complicated. As an example, when an email is to be delivered as a letter, the electronic text of the email may be printed out and delivered to the resident.

In additional or alternative embodiments, the resident may be able to select the delivery format to which a message is converted. As an example, a message originated as an email may be selected by the nonresident to be converted to a voicemail for reception via a telephone by the resident.

If step 108 determines the message is in an appropriate delivery format or the message has been converted via step 105, then step 106 delivers the message to the resident. The delivery of the message may be based on the delivery format of the message, such that an email message is delivered to the resident via a computer that is accessible by the resident; a voicemail message may be delivered to the resident via a telephone that is accessible by the resident; or a letter may be delivered directly to the resident.

Figure 2:
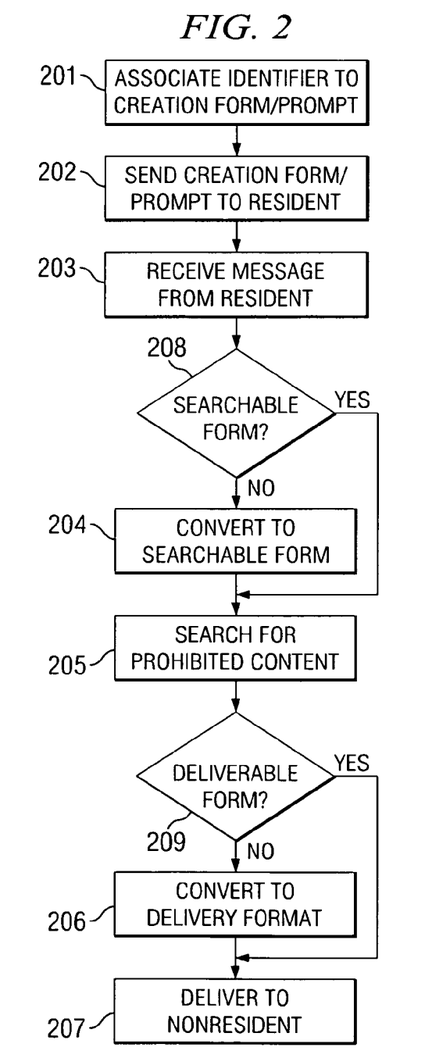
FIG. 2 is a flowchart showing, for an embodiment of the invention, example steps that may be employed for sending a message from a resident of a controlled environment facility to a nonresident.

FIG. 2 is a flowchart illustrating the steps involved in sending a message from a resident to a nonresident of a controlled environment facility, used by a system in accordance with an embodiment of the invention. Step 201 associates an identifier to the creation form or prompt that will be used by the resident to create a message for delivery to the nonresident. Several techniques may be available for a resident to create a message, which include, yet are not limited to: using a computer kiosk according to application Ser. No. 11/125,842 for creating email messages or text messages; using a telephone for creating a voice mail message; writing a letter using pen and paper; and the like. Further embodiments of types of computers that may be used include laptop computers with or without wire line or wireless network connections and Personal Digital Assistants with or without wireless network connections, each of which may be used in a resident's personal area or a common area shared between many residents of the controlled environment facility.

For each of the above communication techniques, an identifier may be pre-associated with the form or prompt that is used by the resident to create a message. In the case of a computer kiosk that is used to create an email message, when the resident selects to create a new message (either in response to a message from the nonresident or originated by the resident), the email program may associate an identifier to the new message before the resident has created the contents of the message. In the case of a telephone that is used to create a voice message, when the resident selects to create a new message, the voice messaging system may associate an identifier to the new message before the resident has dictated the contents of the message. In the case of a resident creating a letter, the pages upon which the message is written may be preprinted with machine readable codes corresponding to an identifier that has been pre-assigned to the message.

Step 202 sends a creation form/prompt to resident. This sending of a creation form/prompt may be based upon a resident's interaction with the system used to deliver a message to the resident or the system used by the resident to generate a message. In the case where the resident is using electronic messaging system (e.g., an email application on a computer, a kiosk, or the like), the creation form may be sent to the resident in response to the resident's clicking on or otherwise selecting a message creation program. In response to the resident's interaction, the electronic messaging system would associate an identifier to the new message before allowing the resident to create the contents of the message. Similarly for the case of a voice messaging system, the resident's interaction to the voice prompts of the system may trigger such a system to add an identifier to the new voice message before its contents have been dictated by the resident. In the case a letter, the resident may request from the controlled environment facility the required materials to create a letter (e.g., a pen and paper), whereupon an identifier will be associated with the new message and a machine readable code, such as a barcode, may be printed onto the paper given to the resident to create the letter.

By associating the identifier to the message before the creation of the contents of the message, the facility or provider may track and store additional information related to the message that may be of further interest to investigators. Such information may include any of: the date and/or time the drafting of the message began; how many drafts of a message were created before a particular message was sent; previous drafts of the message that were not sent; and the like.

In additional or alternative embodiments, the creation form may be delivered as a reply form included with a message from a nonresident. The resident may then use this reply form to respond to the nonresident's message. Per step 201, the reply form may include a unique identifier linking the message created using the reply form to the original message, the billing account used to pay for the original message, the reply address to which the reply message is to be delivered, or the like. This reply form may also be partially filled out indicating the address and nonresident to which the reply will be delivered. In doing so, there is a reduced risk of a resident either accidentally or maliciously filling out the reply form improperly. As an example, a message in the form of a letter may be delivered with multiple reply sheets, wherein the portion of the reply sheets that identifies the original message, the nonresident that will receive the reply, and the address of the nonresident, is already filled in before being delivered to the resident. As another example, a resident that received a letter containing a machine readable code, may scan the code in at a kiosk that has a code scanner. The kiosk may then bring up a messaging program, associate an identifier to the message about to be created, and allow the inmate to create the contents of a message.

According to further embodiments of the invention, an inmate may receive a letter and a detachable form of an identifier, such that the detachable identifier may be removed by the resident and placed onto a reply message created by the resident. The detachable identifier may be the same as that of the identifier from the letter or may be a different and unique identifier. Further, the detachable identifier may take many forms including, but not limited to: an identifier printed onto a sticker; an identifier printed onto a perforated portion of a sheet of paper; and the like.

In step 203 the newly created message is received from the resident. In the case of an electronic message, the resident may click on a send button of an email program or otherwise indicate to the computer program that the message has been completed and should be forwarded for delivery to the nonresident. In the case of a voice message, the resident's interactions may include pressing the touch tone keys of the telephone to signal to the voice messaging system that the message has been completed and should be forwarded for delivery to the nonresident. In the case of a letter, the resident may hand the completed letter to a representative of the controlled environment facility.

In additional or alternative embodiments, a computer, telephone, or voice dictation system may be used as an input for letter writing. As an example, a message entered into a computer by a resident may ultimately be delivered to the nonresident as a letter. As another example, a resident may use a telephone or voice dictation system (e.g., a tape recorder, an MP3 recorder, a computer with microphone attachment, or the like) to create the contents of the message, wherein the contents are ultimately delivered to the nonresident as a letter.

If step 208 determines that the message is not in an appropriate electronically searchable format, then step 204 converts the message to a searchable form. Each different format or method for creating a message may comprise its own unique conversion step with some formats comprising little if any conversion and others comprising more extensive conversion methods. In the case of an electronic messaging system, the conversion process may comprise very little conversion, if any at all, and may comprise loading the message directly into an electronic database. In the case of a voice messaging system, the speech may be the desired searchable form, such that no conversion is necessary, or the speech may be converted to text as the desired searchable form. In the case of a letter, an image of the letter may be scanned into computer system, which then performs an OCR analysis to generate electronic text from the image of the letter.

If step 208 determines that the message is in an appropriate electronically searchable format or the message has been converted via step 204, then step 205 searches the message for content of investigatory interest. Keyword searching, phrase searching, and systems and methods according to application Ser. Nos. 10/720,848 and 11/182,625 may be employed to determine if a message contains content or evidence of activities that are of investigatory interest. Additionally or alternatively, searches relating to the parties involved in the communication, the sending or receiving addresses, the billing account used to pay for the communication, the volume of communication activity, or the like, may be performed. Information based on the output of such searching may be stored and thresholds on the types or amounts of information may be used to determine whether such information is forwarded to a relevant authority. As an example, a single occurrence of certain words or phrases may cause the message to be forwarded to an authority, while other words or phrases may have multiple occurrences before the message is forwarded to an authority. Further, delivery of the message may be based on the information found when searching the message (e.g., messages containing any or a certain amount of prohibited content may be denied delivery).

The identifier may be used for cross-referencing of any evidence of activity with prior evidence of activity of interest to an investigator, to determine a history of activity that may be related to any of: the resident, the nonresident, the controlled environment facility, the billing account, and the like. Such a history of activity may then be analyzed by authorities and/or investigators to determine whether to restrict messaging activities of the resident or nonresident. As an example, the identifier may be stored in electronic form in a computer database, which maintains a file that contains the associations between the identifier and any of: the resident, the nonresident, the controlled environment facility, the billing account, current and prior activity of interest, current and prior content of interest, other files of associations, and the like. Furthering this example, an investigator, authorized by an authority notified about the contents of a message, may review the file of associations to determine if any appropriate action should be brought against the resident, nonresident, facility, or provider.

If step 209 determines the message is not in an appropriate delivery format, then step 206 converts the message into the delivery format. This conversion may use the message from its original form or may use the searchable form of the message. If either the format of the original or searchable forms of the message are equivalent to the delivery format, then little if any conversion may take place. As an example for the case where a resident creates a voice message, the speech of the voice message may be converted to electronic text using a speech to text converter in order to search the message for content of interest. If the delivery format comprises electronic text, then the searchable form of the message (the electronic text generated from the speech to text conversion) may be used as the delivery form of the message. If the delivery format comprises a voice message, then the original voice message may be used as the delivery form of the message. If the message is to be delivered as a letter, then the electronic text that was generated from the speech to text conversion may be printed out for delivery as a letter to the nonresident. In alternative or additional embodiments, the message may be converted into multiple delivery formats for delivery to multiple destinations using different formats.

If step 209 determines the message is in an appropriate delivery format or the message has been converted via step 206, then step 207 delivers the message to the nonresident. The nonresident may select more than one delivery destination that may employ more than one delivery format. In alternative or additional embodiments of the invention, the resident may also select to be notified of a pending message from a resident of a controlled environment facility. The delivery of the message may be conditioned on payment to the provider for such delivery. In the case where the nonresident is the financially responsible party for the billing account, the nonresident may actively select to receive a message before the message is delivered and the nonresident's financial account is debited so that the nonresident may not have to pay for any unwanted or unsolicited communications. In the case where the resident is financially responsible party for the billing account, the billing account may be debited as soon as the message to be delivered is received from the resident (step 203). In either of the above cases, the identifier associated with the message (from step 201) may be used to identify the financial account to be debited for the communication.

In additional or alternative embodiments, a nonresident may elect to have all messages delivered in a printed form to a physical address, yet be notified via an email or voicemail that a newly created message is currently in the process of being delivered. A resident may also receive notification that a message is pending delivery from a system accessible to the resident, such as a computer, computer kiosk, or telephone system of the facility. As an example, a resident may only be allowed to receive paper-based messages from nonresidents via hand-delivery, yet have access to a computer system of the facility that provides notification of pending message deliveries. In such a case, the resident may access the computer system, provide identification, and view any notifications of messages pending delivery. The identification of the resident to the computer system may be provided by any of: a finger print, voice print, or other biometric sample that is input to the computer system; a Radio Frequency IDentification (RFID) bracelet that is scanned when the resident approaches the computer system; a Personal Identification Number (PIN) that is entered by the resident into the computer system; or the like.

Figure 3:
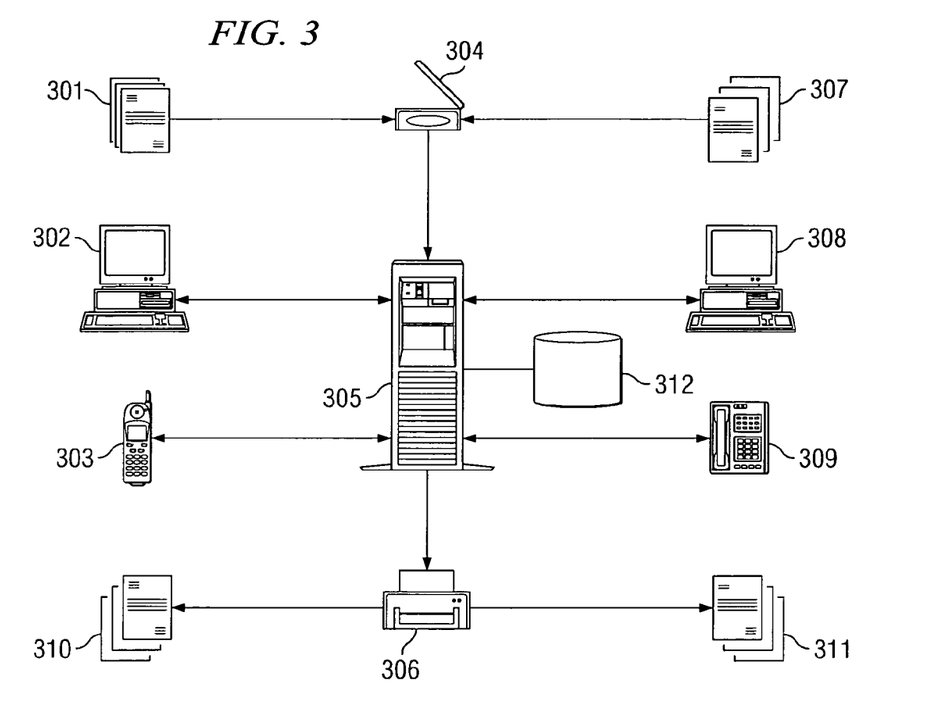
FIG. 3 is a diagram of a system built in accordance with an embodiment of the invention for sending and receiving messages between nonresidents and residents of a controlled environment facility.

FIG. 3 is a diagram of a system built in accordance with an embodiment of the invention for sending and receiving messages between nonresidents and residents of a controlled environment facility. A nonresident has several options for sending and receiving messages to a resident including, but not limited to: sending letter 301 via postal mail; using computer 302 to construct an email or other electronic document; and using mobile phone 303 to send a voice message. In the case of letter 301, an electronic image of letter 301 is generated using scanner 304, which is then stored on server 305 for further processing. In the case of computer 302, a nonresident may create an email, which is then sent to an email account accessible by server 305, such that server 305 may download and store the email. In the case of mobile phone 303, the nonresident may dial into a voicemail messaging system and dictate the message, which is accessible by server 305, such that server 305 may download and store the voicemail message. With a new message from a nonresident, server 305 may further process the message by relating an identifier to the new message, converting the message to a searchable form, searching the searchable form of the message for evidence of prohibited content or activity, and converting the message to a form suitable for delivery to a resident. Should evidence of prohibited content or activity be found, server 305 may notify a relevant authority of such evidence. The authority may take appropriate action, based on such evidence, including: restricting the delivery of the message, restricting activities associated with the billing or financial account associated with the message, restricting the communications or messaging abilities of the resident or nonresident associated with the message, and the like.

Several options may be available for a resident to receive the message that include, but are not limited to: delivery of the message as letter 311, using computer 308, and using telephone 309. In the case of letter 311, the message which is stored in an electronic form on server 305 may be printed using printer 306 to generate letter 311, which may be hand delivered to a resident. In the case of computer 308, server 305 may convert the message into an email that is accessible by the resident at computer 308. In the case of telephone 309, server 305 may convert the message into a voicemail message that is accessible by the resident using telephone 309.

When creating a new message either in response or not in response to a message from a nonresident, the resident may write letter 307 or use computer 308 or telephone 309 to create an email or voicemail. Before the content of the message is generated by the resident, an identifier is associated with the message. In the case of letter 307, the paper used by the resident may have the identifier printed onto the paper in the form of a machine readable code, such as a barcode. In the case of computer 308, the program used to generate the message may associate a UUID to the message prior to allowing the resident to fill in the contents of the message using the program. In the case of telephone 309, the voice messaging system may associate a unique set of letters and/or numbers to the message prior to allowing the resident to dictate the contents of the message using the voice messaging system.

The message is then delivered to and stored on server 305. In the case of letter 307, an electronic image of letter 307 is generated using scanner 304, which is then stored on server 305 for further processing. In the case of computer 308, a resident may create an electronic text message that is stored on server 305, which may later be converted to an email for delivery to the nonresident. In the case of telephone 309, the resident may dictate the message to a voicemail messaging system, which is accessible by server 305, such that server 305 may download and store the voicemail message. With a new message from a resident, server 305 may further process the message by, converting the message to a searchable form, searching the searchable form of the message for prohibited content or activity, and converting the message to a form suitable for delivery to a nonresident.

Several options may be available for a nonresident to receive the message that include, but are not limited to: delivery of the message as letter 310, using computer 302, and using mobile phone 303. In the case of letter 310, the message which is stored in an electronic form on server 305 may be printed using printer 306 to generate letter 310, which may be delivered via postal mail to a nonresident. In the case of computer 302, server 305 may convert the message into an email, which is sent to an account that is accessible by the nonresident at computer 302. In the case of mobile phone 303, server 305 may convert the message into a voicemail message that is accessible by the nonresident using mobile phone 303.

Server 305 may store the identifiers of multiple messages electronically in database 312. For each identifier stored, database 312 may also store the associations between the identifier and any of: multiple residents/nonresidents allowed to use the account; addresses associated with the account; facilities associated with the account; any prior content or evidence of activities of investigative interest; and the like. Database 312 may also have thresholds set for any of the information contained within, such that when such a threshold is met or surpassed, an authority or investigator may be notified. Such thresholds may include, but are not limited to: when a message is sent to a resident/nonresident that has been newly associated to an account; the volume of activity of an account to which the identifier is associated; content or evidence of activities that are of investigative interest that are associated with an identifier; prior content or evidence of activities that are of investigative interest that are associated with an identifier. With such a database, authorities and/or investigators may focus their time on more relevant and interesting matters instead of searching through all of the messages between residents and nonresidents.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting a message between a nonresident and a resident of a controlled environment facility, said method comprising:
    associating an identifier with a message, content of said message is created by said resident after said associating, said identifier comprising a machine readable code specific to the message, said machine readable code comprising a barcode or a numerical identifier on a message sheet used by the resident to create the content of the message; and
    debiting a financial account for providing a service in association with said message, wherein said financial account is associated with said message using said identifier.

2. The method of claim 1 further comprising:
    converting said message to a form suitable for electronic searching; and
    searching said message for information of interest to investigators.

3. The method of claim 2 further comprising:
    alerting an investigator when said searching finds said information of interest, the information of interest comprising the occurrence of predefined words or phrases, the alerting occurring upon a first detection of any of a first set of words or phrases, and the alerting occurring after a predetermined number of occurrences of any of a second group of words and phrases.

4. The method of claim 1, wherein said identifier comprises at least one of: a Universally Unique Identifier (UUID), a machine readable code, and a Personal Identification Number (PIN).

5. The method of claim 1, wherein said barcode is printed on a detachable sticker for placement onto said message sheet.

6. The method of claim 5, wherein said barcode is printed onto said message sheet.

7. The method of claim 1 further comprising:
creating said content using a first form of communication; and
delivering said message to said nonresident using a second form of communication.

8. The method of claim 1 further comprising controlling the delivery of said message by an owner of said financial account.

9. A method for transmitting a message between a nonresident and a resident of a controlled environment facility, said method comprising:
receiving a message, wherein said message is in a first form of communication that is not receivable by a resident;
delivering said message to said resident in a second form of communication that is receivable by said resident;
receiving a reply prepared by the resident in response to the message, the reply comprising an identifier, the identifier uniquely linking the reply to the message; and
associating the identifier to additional information regarding drafts of the reply.

10. The method of claim 9 further comprising:
converting said message to a form suitable for electronic searching; and
searching said message for information of interest to investigators.

11. The method of claim 10 further comprising:
alerting an investigator when said searching finds said information of interest, the information of interest comprising the occurrence of predefined words or phrases, the alerting occurring upon a first detection of any of a first set of words or phrases, and the alerting occurring after a predetermined number of occurrences of any of a second group of words and phrases.

12. The method of claim 9, wherein said identifier comprises at least one of: a Universally Unique Identifier (UUID), a machine readable code, and a Personal Identification Number (PIN).

13. The method of claim 9, wherein said identifier comprises a machine readable code, and wherein said machine readable code comprises a barcode on a message sheet used by said resident to create said contents of said reply.

14. The method of claim 13, wherein said barcode is printed on a detachable sticker for placement onto said message sheet.

15. The method of claim 13, wherein said barcode is printed onto said message sheet.

16. The method of claim 9 further comprising:
creating content of the message using a first form of communication; and
delivering said message to said nonresident using a second form of communication.

17. A method for transmitting a message between a nonresident and a resident of a controlled environment facility, said method comprising:
receiving a message in a first form of communication that is not receivable by a resident;
delivering said message to said resident in a second form of communication that is receivable by said resident;
delivering an identifier with said message in said second form, the identifier uniquely associated with the message and related messages; and
associating said identifier with a response to said message.

18. The method of claim 17 further comprising:
converting said message to a form suitable for electronic searching; and
searching said message for information of interest to investigators.

19. The method of claim 18 further comprising:
alerting an investigator when said searching finds said information of interest.

20. The method of claim 17, wherein said identifier comprises at least one of: a Universally Unique Identifier (UUID), a machine readable code, and a Personal Identification Number (PIN).

21. The method of claim 17, wherein said identifier comprises a machine readable code, and wherein said machine readable code comprises a barcode on a message sheet delivered to said resident.

22. The method of claim 21, wherein said barcode is printed on a detachable sticker for placement onto said message sheet.

23. The method of claim 21, wherein said barcode is printed onto said message sheet.

24. The method of claim 17 further comprising:
creating content of said message using a first form of communication; and
delivering said message to said nonresident using a second form of communication.

25. A system for transmitting a message between a nonresident and a resident of a facility, said system comprising:
a message input module for receiving a message;
wherein said input module associates an identifier with a nonresident created message; and
wherein said input module associates the identifier with a resident created message, the identifier uniquely linking messages and related responses;
a database storing associations between the identifier, related messages, and billing accounts, the database accessible to authorities investigating content of the messages; and
a financial module for debiting a financial account for providing a service in association with said message, wherein said financial account is associated with said message using said identifier.

26. The system of claim 25 further comprising:
a conversion module adapted for performing at least one of the processes of:
converting said nonresident created message to a form receivable by said resident; and
converting said resident created message to a form selected by said nonresident.

27. The system of claim 25 further comprising:
a conversion module adapted for performing the processes of converting a message to an electronically searchable form; and
a searching module adapted for performing the processes of searching said electronically searchable form for information of interest to an investigator.

28. The system of claim 27 wherein said searching module is further adapted to alert said investigator when said searching module finds said information of interest.

29. The system of claim 25, further comprising at least two of:
an electronic messaging system accessible to said nonresident and said resident through the use of an electronic device;
a voice messaging system accessible to said nonresident and said resident through the use of a telephone;

a scanning system and printing system, wherein said scanning system is adapted for converting a paper form of a message into an electronic form and said printing system is adapted for converting an electronic form of a message into a paper form.

30. The system of claim 25, wherein said identifier comprises at least one of: a Universally Unique Identifier (UUID), a machine readable code, and a Personal Identification Number (PIN).

31. The system of claim 25, wherein said identifier comprises a machine readable code, and wherein said machine readable code comprises a barcode on a message sheet used by said resident to create said content of said message.

32. The system of claim 31, further comprising a printing module adapted for printing said barcode on a detachable sticker for placement onto said message sheet.

33. The method of claim 31, further comprising a printing module adapted for printing said barcode onto said message sheet.

* * * * *